(12) United States Patent
Mustalahti et al.

(10) Patent No.: US 9,038,781 B2
(45) Date of Patent: May 26, 2015

(54) ELEVATOR AND ARRANGEMENT FOR EMERGENCY STOPPING AN ELEVATOR CAR

(75) Inventors: Jorma Mustalahti, Hyvinkää (FI); Esko Aulanko, Kerava (FI)

(73) Assignee: KONE CORPORATION, Helsinki (FI)

( * ) Notice: Subject to any disclaimer, the term of this patent is extended or adjusted under 35 U.S.C. 154(b) by 916 days.

(21) Appl. No.: 12/230,836

(22) Filed: Sep. 5, 2008

(65) Prior Publication Data

US 2009/0223748 A1    Sep. 10, 2009

Related U.S. Application Data

(63) Continuation of application No. PCT/FI2007/000080, filed on Apr. 2, 2007.

(30) Foreign Application Priority Data

Apr. 4, 2006    (FI) ..................................... 20060329

(51) Int. Cl.
*B66B 11/08*    (2006.01)
*F16D 41/066*    (2006.01)
(Continued)

(52) U.S. Cl.
CPC ............... *B66B 11/043* (2013.01); *B66B 11/08* (2013.01); *F16D 41/066* (2013.01)

(58) Field of Classification Search
CPC ........ B66B 11/08; B66B 11/008; B66B 5/02; B66B 5/12; B66B 15/04; B66D 1/36; F16D 41/066; F16D 2041/0665
USPC ........... 187/254, 256, 373; 310/67 R; 464/41; 188/30, 343, 82.84, 82.8; 242/289, 242/295, 300, 381, 381.5, 394.1; 192/44, 192/45, 52.1, 52.4; 254/266, 278, 293
See application file for complete search history.

(56) References Cited

U.S. PATENT DOCUMENTS 1,834,937 A * 12/1931 Buettell ......................... 187/256
1,921,554 A *  8/1933 Wellman et al. ............ 192/12 B
(Continued)

FOREIGN PATENT DOCUMENTS

DE    2 264 615    9/1974
EP    0 687 643    12/1995
(Continued)

OTHER PUBLICATIONS

EPO, Machine Translation, FR 2489800 A, Aug. 11, 2014, pp. 1-6.*
(Continued)

*Primary Examiner* — William A Rivera
*Assistant Examiner* — Stefan Kruer
(74) *Attorney, Agent, or Firm* — Harness, Dickey & Pierce, PLC

(57) ABSTRACT

An elevator may include an elevator car, a set of hoisting ropes, a hoisting machine, a traction sheave, and a brake. The elevator car may be suspended on the hoisting ropes. The hoisting machine may drive the traction sheave to move the elevator car using the hoisting ropes. The brake may include a brake wheel and brake shoes. The brake may exert an effect on rotation of the traction sheave. During braking, the effect of the brake on the rotation of the traction sheave may depend on a direction of rotation of the traction sheave. The effect of the brake on the rotation of the traction sheave may be greater when the direction of rotation of the traction sheave during braking corresponds to the elevator car moving downward than when the direction of rotation of the traction sheave during braking corresponds to the elevator car moving upward.

20 Claims, 3 Drawing Sheets

(51) Int. Cl.
*F16D 43/18* (2006.01)
*B66B 11/04* (2006.01)

(56) References Cited

U.S. PATENT DOCUMENTS

| | | | |
|---|---|---|---|
| 2,225,278 | A | 12/1940 | Robin et al. |
| 3,762,512 | A | 10/1973 | McIntyre |
| 4,412,600 | A | 11/1983 | Ito et al. |
| 4,977,982 | A | 12/1990 | Bialy et al. |
| 5,007,505 | A | 4/1991 | Lindegger |
| 5,230,406 | A | 7/1993 | Poon |
| 5,310,022 | A | 5/1994 | Sheridan et al. |
| 5,324,007 | A * | 6/1994 | Freneix ............... 254/300 |
| 5,363,942 | A | 11/1994 | Osada |
| 5,370,208 | A | 12/1994 | De Jong |
| 5,386,889 | A | 2/1995 | Pipes |
| 5,595,272 | A * | 1/1997 | Zhou ............... 192/45 |
| 5,638,929 | A * | 6/1997 | Park ............... 192/44 |
| 5,695,031 | A * | 12/1997 | Kurita et al. ............... 192/45 |
| 5,779,588 | A | 7/1998 | Mann et al. |
| 5,788,018 | A | 8/1998 | Mendelsohn et al. |
| 6,170,625 | B1 * | 1/2001 | Tanaka ............... 192/45 |
| 6,374,953 | B1 | 4/2002 | Casas |
| 6,374,964 | B2 | 4/2002 | Mustalahti et al. |
| 2003/0085078 | A1 | 5/2003 | Simmonds et al. |
| 2005/0126862 | A1 | 6/2005 | Ito |
| 2006/0289240 | A1 * | 12/2006 | Sakita ............... 187/249 |
| 2007/0089937 | A1 * | 4/2007 | Ito ............... 187/350 |
| 2007/0170409 | A1 | 7/2007 | Ito |
| 2007/0227833 | A1 | 10/2007 | Aulanko et al. |
| 2008/0264729 | A1 | 10/2008 | Mustalahti et al. |

FOREIGN PATENT DOCUMENTS

| | | | |
|---|---|---|---|
| EP | 1 457 700 | | 9/2004 |
| FI | 20041044 | | 6/2004 |
| FR | 2489800 A * | 3/1982 | ............ B66B 11/08 |
| GB | 2 001 214 | | 1/1979 |
| JP | 06-199483 | | 7/1994 |
| JP | 2003-042202 | | 2/2003 |
| SU | 1004250 | | 3/1983 |
| SU | 1252298 | | 8/1986 |
| SU | 1744027 A1 | | 6/1992 |
| WO | WO 2005/050051 A1 | | 6/2005 |
| WO | WO 2005121006 A1 * | 12/2005 | ............ B66B 5/16 |
| WO | WO 2006010781 A2 * | 2/2006 | ............ B66B 5/04 |
| WO | WO 2006/038284 A1 | | 4/2006 |

OTHER PUBLICATIONS

Office Action from the European Patent Office dated Jul. 27, 2009, for counterpart European Patent Application No. 07 704 786.8-1256.

* cited by examiner

ELEVATOR AND ARRANGEMENT FOR EMERGENCY STOPPING AN ELEVATOR CAR

CROSS-REFERENCE TO RELATED APPLICATIONS

This application is a continuation of International Application No. PCT/FI2007/000080, filed on Apr. 2, 2007 (also known as World Intellectual Property Organization International Publication No. WO 2007/113374 A1), in the Receiving Office of the National Board of Patents and Registration of Finland ("NBPRF"); and claims priority from that application and Finnish Patent Application No. 20060329: filed on Apr. 4, 2006, in the NBPRF; the entire contents of all of which are incorporated herein by reference.

BACKGROUND

1. Field

The present invention relates to an elevator and an arrangement for stopping an elevator car in an emergency braking situation.

2. Description of Related Art

In the case of more sophisticated elevators, deceleration of the elevator car in normal situations, i.e. when the elevator car is to be brought to a stop at a landing, is usually implemented using motor braking. However, according to regulations, elevators must be provided with a device capable of emergency braking, which is activated in abnormal situations, such as situations caused by power failures or certain disturbances affecting safety. The emergency brake used is e.g. the normal elevator brake, which keeps the elevator car stationary in normal situations when the car is at a landing. Especially in elevators without counterweight, but also in counterweighted traction sheave elevators having a counterweight that is particularly light in relation to the elevator car, emergency braking of the elevator car during upward travel together with the effect of gravity may produce a deceleration of the elevator car large enough to cause a potential risk to passenger safety. In fast counterweighted elevators, as a result of sudden stopping of the traction sheave, the ropes will start sliding at a high speed while the frictional grip is reduced, which again may cause new problems.

SUMMARY

The object of the present invention is to overcome the above-mentioned drawbacks and to create a simple arrangement for stopping a moving elevator car in the event of an emergency stop, an arrangement that is reliable and safe for the passengers. The invention aims at a solution where the elevator car of an elevator without counterweight is not decelerated too effectively or not necessarily decelerated at all by application of an emergency brake during upward travel. A further object of the arrangement of the invention is to allow an elevator car traveling upwards in an emergency braking situation to continue moving upwards at least partially freely in spite of the braking, the movement of the car being thus decelerated safely and slowly and finally stopped due to gravity.

The elevator and the arrangement are discussed below. Some embodiments are characterized by what is disclosed in the claims.

Inventive embodiments are also presented in the description part and drawings of the present application. The inventive content disclosed in the application can also be defined in other ways than is done in the claims below. The inventive content may also consist of several separate inventions, especially if the invention is considered in the light of explicit or implicit sub-tasks or with respect to advantages or sets of advantages achieved. In this case, some of the attributes contained in the claims below may be superfluous from the point of view of separate inventive concepts. Within the framework of the basic concept of the invention, Similarly, the various details described in conjunction with each embodiment example features of different embodiments of the invention can be applied used in conjunction with other embodiment examples as wells.

The starting point in the implementation of the inventive concept is to avoid the decelerating effect of the brake on the elevator car when the elevator car is moving upwards, but the invention can also be applied in a way that allows the decelerating effect of the brake on the elevator car to be transmitted so as to decelerate upward motion of the elevator car with less force than its downward motion. In a preferred case, the invention can be implemented using a coupling between the rotary motions of the traction sheave and brake wherein the transmission of force from the brake to the traction sheave is implemented using a one-way clutch or the like, whereby the force is only transmitted when the traction sheave is rotating in one direction of rotation.

The arrangement of the invention has the advantage that the movement of the elevator car in the case of elevators without counterweight is not decelerated too fast in emergency braking situations, and thus the passengers in the car undergo no risk due to sudden stopping of the elevator car. Besides a safe structure, an additional advantage is a dependable structure that is reliable in operation.

BRIEF DESCRIPTION OF THE DRAWINGS

In the following, the invention will be described in detail by referring to an embodiment example and the attached drawings, wherein.

DETAILED DESCRIPTION OF EXAMPLE EMBODIMENTS

Figure 1:
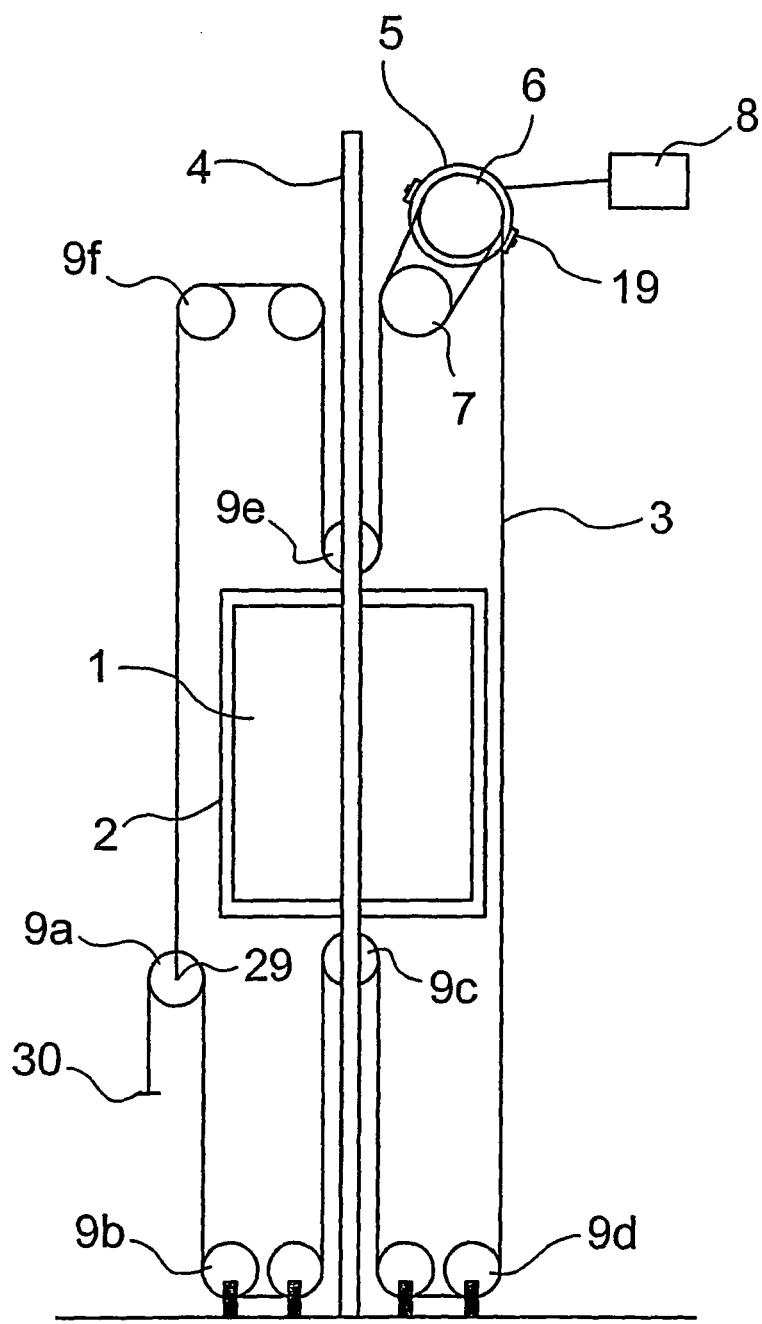
FIG. 1 presents a simplified and diagrammatic side view of a traction sheave elevator without counterweight applying the arrangement of the invention.

FIG. 1 presents a simplified and diagrammatic side view of a traction sheave elevator without counterweight applying the arrangement of the invention, said elevator comprising at least an elevator hoisting machine 5 with a hoisting motor, a traction sheave 6, an elevator control system 8 and an elevator car 1 mounted inside a car frame 2 movable along guide rails 4 in a substantially vertical direction and suspended on a set of hoisting ropes 3. The first end 29 of the hoisting ropes 3 is secured to a fixed point on a rope compensating device, from where the hoisting ropes are passed over a diverting pulley 9a comprised in the rope compensating device and further under one or more diverting pulleys 9b placed on the bottom of the elevator shaft, after which the hoisting ropes are passed upwards to a diverting pulley 9c below the elevator car, and having passed over this pulley the hoisting ropes are again passed downwards and under one or more other diverting pulleys 9d placed on the bottom of the elevator shaft. After this, the hoisting ropes 3 are passed upwards and over the traction sheave 6, and after that under a diverting pulley 7 comprised in the hoisting machine 5 and further a second time over the traction sheave 6 and then under a diverting pulley 9e placed on the top side of the elevator car and again upwards over one or more diverting pulleys 9f. Having passed over these pulleys, the hoisting ropes 3 are passed downwards to the diverting pulley 9a of the rope compensating device, to which the second end 30 of the set of hoisting ropes is secured.

The elevator receives its hoisting power from the hoisting machine 5 by virtue of the friction between the traction sheave 6 and the hoisting ropes 3. The elevator car suspension presented in FIG. 1 is a simplified suspension structure for an elevator without counterweight. The hoisting ropes 3 can also be passed in different ways via more diverting pulleys so as to obtain a suspension ratio of desired magnitude. In addition, the hoisting machine is provided with e.g. two brakes 19, which are placed on opposite sides of the central axis. The brake 19 is actually a holding brake, which keeps the elevator car 1 stationary when the car is at a landing. Normally the braking of the elevator car from its motion is implemented as motor braking by the hoisting machine. However, the brake 19 is used for emergency braking as well. Due to the good friction between the hoisting ropes 3 and the traction sheave 5, no rope slip occurs on the traction sheave, and consequently the brake can provide a very great deceleration. However, excessive deceleration is a problem especially during upward travel, as was already stated above. For this reason, according to the present invention, during emergency braking when the elevator car 1 is moving upwards, the effect of the brake 19 is reduced by allowing the elevator car to decelerate and stop substantially by itself due to gravity.

Figure 2:
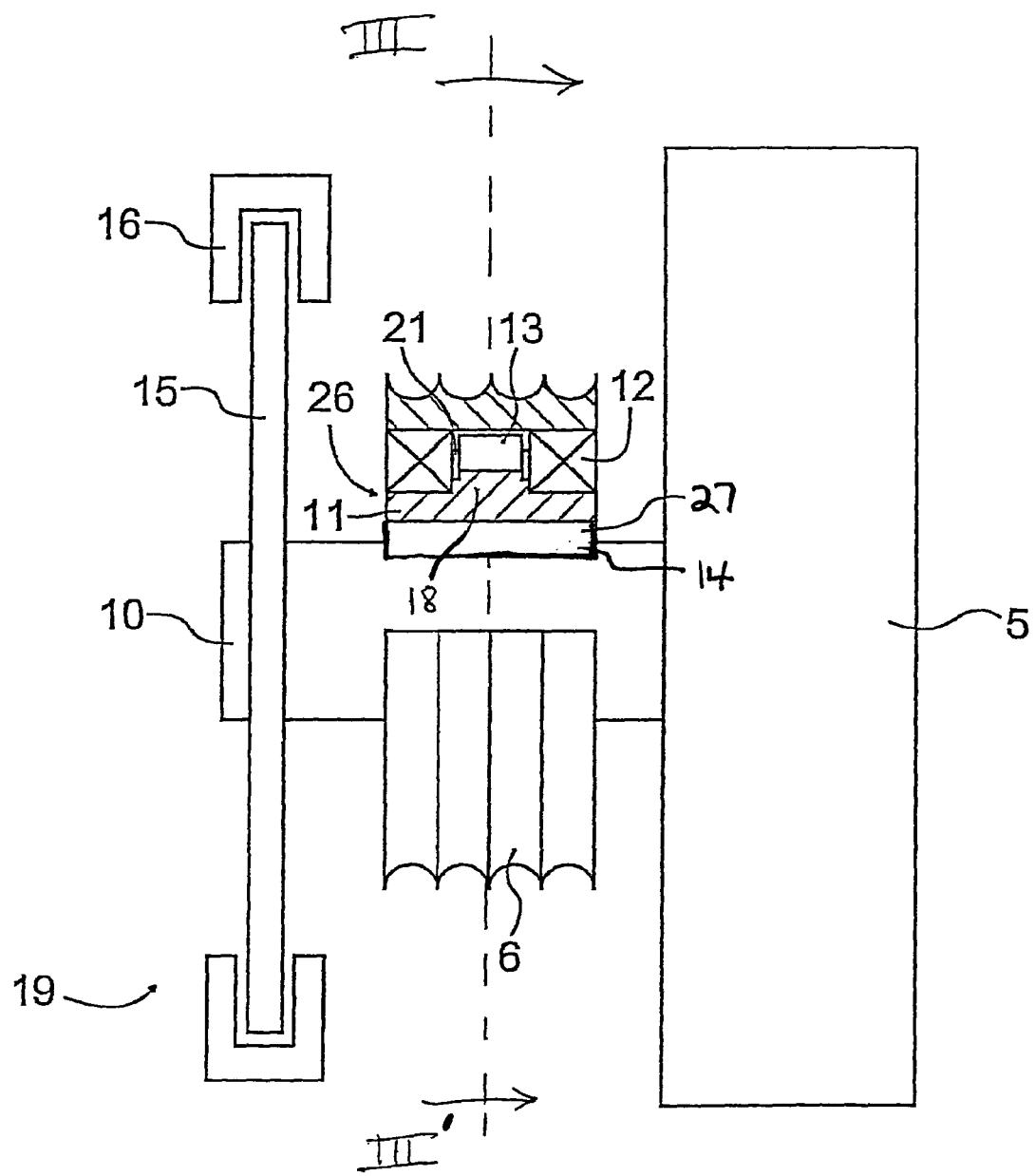
FIG. 2 presents a simplified, diagrammatic and sectioned front view of an elevator hoisting machine with a traction sheave and a brake and a one-way clutch according to the invention used in the machine.

FIG. 2 presents a simplified, diagrammatic and sectioned illustration of the principle of an elevator hoisting machine 5 with a traction sheave 6 and a brake 19 and a one-way clutch 26 according to the invention as used in the machine, shown in front view. Being an illustration of principle, the structure according to FIG. 1 does not directly correspond to the structure of the hoisting machine presented in FIG. 1. The hoisting machine 5 comprises a central axle 10 rotated by the motor, on which axle is fitted an inner ring 11 forming the hub of the one-way clutch 26 and connected via bearings 12 to the traction sheave 6, which forms the outer ring of the one-way clutch. The inner ring 11 of the one-way clutch is locked by means of a wedge 27 in a wedge slot 14 provided in the axle of the hoisting machine, ensuring that the inner ring 11 of the one-way clutch rotates with the axle 10.

Fitted on the central axle 10 is also the brake 19, which consists of a brake wheel 15 fitted on the axle 10 and brake shoes 16 arranged to be pressed into engagement with the brake wheel 15 when the brake 19 of the elevator is activated. This brake 19 is used as the normal holding brake of the elevator to hold the elevator car 1 stationary at the landing and also as an emergency brake in abnormal situations. The brake may have any suitable construction provided that the brake is adapted to prevent and brake the rotary motion of the axle 10.

Figure 3:
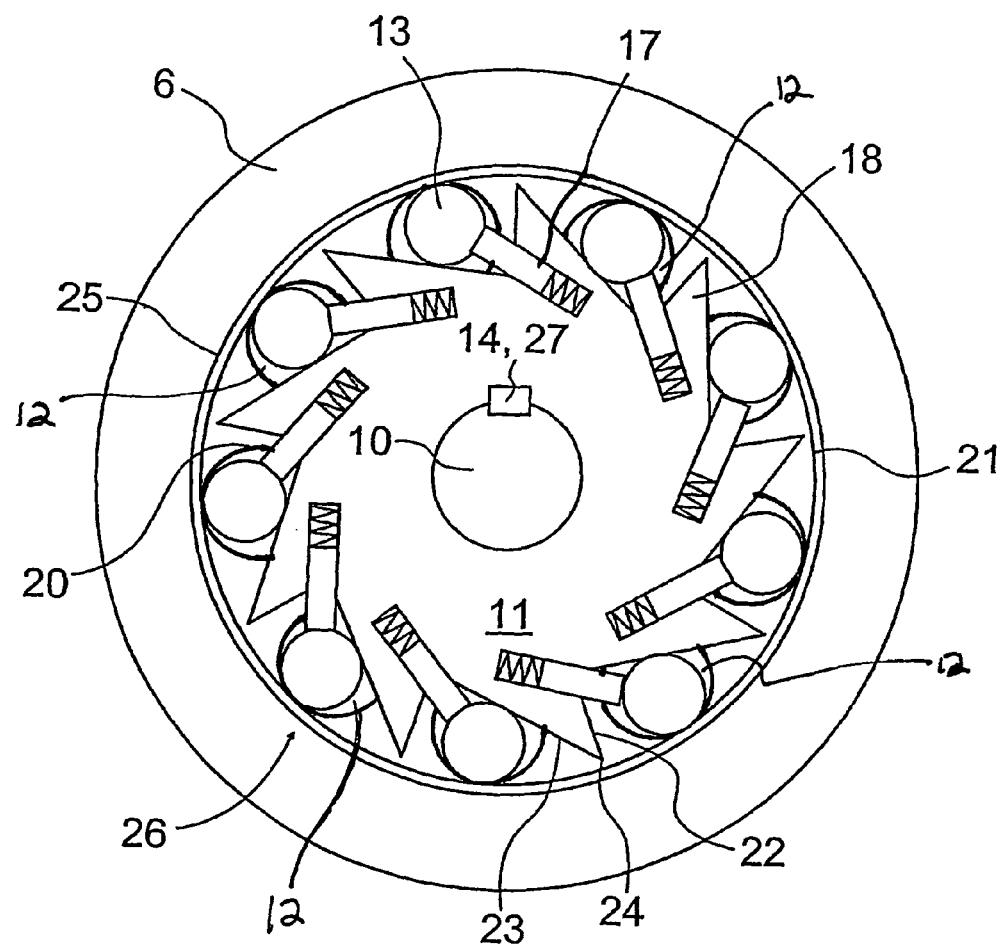
FIG. 3 shows a cross-sectional view of the inner ring, wedge rollers, wedge, sprung pins, traction sheave, and bearings of an elevator hoisting machine, taken along III-III' of FIG. 2.

FIG. 3 presents the traction sheave 6 of an elevator hoisting machine and a one-way clutch 26 applicable for use in the invention, in a simplified and diagrammatic side view. The figure is not depicted in scale. The inner ring 11 of the one-way clutch is fitted on the axle 10 of the hoisting motor. Made on the circumference of the inner ring 11 of the one-way clutch are tooth-like cogs 18 disposed at substantially even distances, so that, as seen from the side, the inner ring 11 resembles a notch wheel or ratchet wheel with a kind of pockets 20 formed between the teeth. The end surface 22 of the cogs extends substantially in the direction of the radius of the inner ring, while the outer surface 23 is oriented obliquely inwards from the tip 24 of the cog separating the end surface 22 and outer surface 23 towards the next cog 18. Placed in the pockets 20 formed between the inner surface 22 of the cog 18 and the outer surface 23 of the adjacent cog are wedge rollers 13 functioning as wedge elements, and on either side of the inner ring 11 of the one-way clutch are guide plates 21 fitted to prevent the wedge rollers 13 from falling sideways off the pockets 20 of the inner ring 11 of the one-way clutch. The one-way clutch is additionally provided with sprung pins 17 serving as pushing elements, which are placed in the cogs 18 of the inner ring 11 and arranged to push the wedge rollers 13 in the pockets 20 along the oblique outer surface of the adjacent cog towards the inner surface 25 of the traction sheave 6. The wedge rollers 13 are arranged to be wedged against the inner surface of the traction sheave 6 when the elevator car 1 is being moved by the motor by rotating the axle 10. The inner ring 11, the wedge rollers 13 and the traction sheave 6 together form a one-way clutch 26 which, during upward movement, allows the traction sheave 6 to continue rotating at least partially freely in an emergency braking situation when the rotational speed of the axle 10 is retarded by the brake 19.

When the machine is operated to drive the elevator car 1 in the up direction, the hoisting machine 5 is arranged to rotate the inner ring 11 of the one-way clutch clockwise in the situation illustrated in FIG. 3, whereby the wedge rollers 13, being pressed by the sprung pins 17, are wedged between the outer surface 23 of the inner ring 11 of the one-way clutch and the inner surface 25 of the traction sheave 6, with the result that the traction sheave 6 also starts rotating and the elevator car 1 is set in motion. When the elevator car 1 is driven downwards, the hoisting machine 5 rotates the inner ring 11 of the one-way clutch in the counter-clockwise direction in the situation of FIG. 3, and the wedge rollers 13, pushed by the inner ring 11, are wedged against the inner surface 25 of the traction sheave 6, with the result that that the elevator car 1 moves downwards at the desired speed.

In an emergency braking situation, the brake 19 is arranged to stop the rotation of the axle 10 and therefore also the rotation of the inner ring 11 of the one-way clutch. However, in an emergency braking situation during upward travel, i.e. when the axle 10 is rotating clockwise in the case illustrated in FIG. 3, the traction sheave 6 should not stop simultaneously when the rotation of the axle 10 is retarded or stopped. According to the invention, the inner ring 25 of the traction sheave pushes the wedge rollers 13 inwards in their pockets and the traction sheave 6 continues rotating partially freely. Yet the upward movement of the elevator car 1 is retarded due to gravity and finally the movement stops. After the movement has stopped, the elevator car 1 tends to start moving downwards due to gravity, whereupon the wedge rollers 13 get wedged between the inner ring 11 of the one-way clutch and the inner surface 25 of the traction sheave 6 and the elevator car 1 is locked in place.

Correspondingly, when the emergency brake is engaged during downward travel, the wedge rollers 13 remain wedged between the inner ring 11 of the one-way clutch and the traction sheave 6, and consequently the brake 19 stops the traction sheave 6 and therefore also the movement of the elevator car 1.

It is obvious to a person skilled in the art that the invention is not exclusively limited to the example described above, but that it can be varied within the scope of the claims presented below. Thus, for example, the one-way clutch used in the arrangement may be different from the above-described wedge-roller one-way clutch. It may be some other type of wedge-roller one-way clutch or even a one-way clutch or corresponding element of a completely different type, e.g. a friction-element one-way clutch.

It is likewise obvious to a skilled person that the suspension of the elevator car can be implemented in a manner differing from the above description. A desired suspension ratio can be achieved e.g. by adding diverting pulleys and disposing them differently.

It is further obvious to a skilled person that, instead of being used in an elevator without counterweight, the arrangement of the invention can equally well be used in a counterweighted elevator.

The invention claimed is:

1. An arrangement for stopping an elevator car of an elevator, the elevator comprising the elevator car, a set of hoisting ropes, a hoisting machine, a traction sheave, and a brake that exerts an effect on rotation of the traction sheave, wherein the elevator car is suspended on the set of hoisting ropes, wherein the hoisting machine drives the traction sheave to move the elevator car using the set of hoisting ropes, and wherein the brake comprises a brake wheel and brake shoes, the arrangement comprising:
a device configured to control the effect of the brake on the rotation of the traction sheave depending on a direction of rotation of the traction sheave;
wherein during normal braking operation, the device is engaged when the elevator car is moving upward,
wherein during emergency braking operation the device is not engaged when the elevator car is moving upward, and
wherein the device is inside a rim of the traction sheave.

2. The arrangement of claim 1, wherein the device is a one-way clutch.

3. The arrangement of claim 2, wherein the one-way clutch comprises:
an inner ring; and
one or more wedge elements;
wherein when the hoisting machine is rotating an axle of the traction sheave, the one or more wedge elements are configured to wedge between an outer surface of the inner ring and an inner surface of the traction sheave in order to rotate the traction sheave.

4. The arrangement of claim 3, wherein each of the one or more wedge elements comprises a spring-loaded roller.

5. The arrangement of claim 4, wherein each spring-loaded roller is configured to be urged toward the inner surface of the traction sheave.

6. The arrangement of claim 3, wherein the inner ring comprises:
a plurality of cogs;
wherein pockets are formed between the cogs, and
wherein the one or more wedge elements are in the pockets.

7. The arrangement of claim 3, wherein each of the one or more wedge elements comprises a friction element.

8. The arrangement of claim 1, wherein during the emergency braking operation, the device is configured to allow the traction sheave to continue rotating when the brake is engaged and the elevator car is moving upward.

9. The arrangement of claim 1, wherein when the hoisting machine is rotating an axle of the traction sheave, the device is configured to wedge against an inner surface of the traction sheave in order to rotate the traction sheave.

10. The arrangement of claim 1, wherein the effect of the brake on the rotation of the traction sheave is greater when the direction of the rotation of the traction sheave during braking corresponds to the elevator car moving downward than when the direction of the rotation of the traction sheave during the braking corresponds to the elevator car moving upward.

11. An elevator, comprising:
an elevator car;
a set of hoisting ropes;
a hoisting machine;
a traction sheave;
a brake that exerts an effect on rotation of the traction sheave; and
a device configured to control the effect of the brake on the rotation of the traction sheave depending on a direction of the rotation of the traction sheave;
wherein the elevator car is suspended on the set of hoisting ropes,
wherein the hoisting machine drives the traction sheave to move the elevator car using the set of hoisting ropes,
wherein the brake comprises:
a brake wheel; and
brake shoes;
wherein during normal braking operation the device is engaged when the elevator car is moving upward,
wherein during emergency braking operation the device is not engaged when the elevator car is moving upward, and
wherein when the hoisting machine is rotating an axle of the traction sheave, the device is configured to wedge against an inner surface of the traction sheave in order to rotate the traction sheave.

12. The elevator of claim 11, wherein during the emergency braking operation, the device is configured to allow the traction sheave to continue rotating when the brake is engaged and the elevator car is moving upward.

13. The elevator of claim 11, wherein the effect of the brake on the rotation of the traction sheave is greater when the direction of the rotation of the traction sheave during braking corresponds to the elevator car moving downward than when the direction of the rotation of the traction sheave during the braking corresponds to the elevator car moving upward.

14. An elevator, comprising:
an elevator car;
a set of hoisting ropes;
a hoisting machine;
a traction sheave;
a brake that exerts an effect on rotation of the traction sheave; and
a device configured to control the effect of the brake on the rotation of the traction sheave depending on a direction of the rotation of the traction sheave;
wherein the elevator car is suspended on the set of hoisting ropes,
wherein the hoisting machine drives the traction sheave to move the elevator car using the set of hoisting ropes,
wherein the brake comprises:
a brake wheel; and
brake shoes;
wherein during normal braking operation the device is engaged when the elevator car is moving upward,
wherein during emergency braking operation the device is not engaged when the elevator car is moving upward, and
wherein the device is a one-way clutch.

15. The elevator of claim 14, wherein the one-way clutch comprises:
an inner ring; and
one or more wedge elements;

wherein when the hoisting machine is rotating an axle of the traction sheave, the one or more wedge elements are configured to wedge between an outer surface of the inner ring and an inner surface of the traction sheave in order to rotate the traction sheave.

16. The elevator of claim 15, wherein the inner ring comprises:
a plurality of cogs;
wherein pockets are formed between the cogs, and
wherein the one or more wedge elements are in the pockets.

17. The elevator of claim 15, wherein each of the one or more wedge elements comprises:
a spring-loaded roller; or
a friction element.

18. The elevator of claim 14, wherein the effect of the brake on the rotation of the traction sheave is greater when the direction of the rotation of the traction sheave during braking corresponds to the elevator car moving downward than when the direction of the rotation of the traction sheave during the braking corresponds to the elevator car moving upward.

19. The elevator of claim 14, wherein during the emergency braking operation, the device is configured to allow the traction sheave to continue rotating when the brake is engaged and the elevator car is moving upward.

20. The elevator of claim 14, wherein when the hoisting machine is rotating an axle of the traction sheave, the device is configured to wedge against an inner surface of the traction sheave in order to rotate the traction sheave.

* * * * *